United States Patent [19]
Binnie et al.

[11] 3,868,640
[45] Feb. 25, 1975

[54] INTERROGATION OF REMOTE STATIONS VIA AUTOMATIC DIALLER

[75] Inventors: Alexander Joseph Binnie, Luton; Kenneth Bowdell, Shefford; Philip James Clark, Luton, all of England

[73] Assignee: George Kent Limited, Luton, Bedfordshire, England

[22] Filed: May 8, 1972

[21] Appl. No.: 251,203

[30] Foreign Application Priority Data

May 13, 1971 Great Britain .................... 14638/71

[52] U.S. Cl. ................................ 340/151, 340/103
[51] Int. Cl. ................................ H04g 9/00
[58] Field of Search ............ 340/152 R, 151, 163 R; 179/2 OP

[56] References Cited

UNITED STATES PATENTS

| | | | |
|---|---|---|---|
| 3,047,662 | 7/1962 | Smith | 340/151 X |
| 3,266,018 | 8/1966 | Higgins | 340/151 R |
| 3,350,687 | 10/1967 | Gabrielson | 340/151 X |
| 3,376,389 | 4/1968 | Fair | 340/151 X |
| 3,383,467 | 4/1968 | New et al. | 340/151 X |
| 3,435,416 | 3/1969 | Kretsch | 340/163 R |
| 3,510,841 | 5/1970 | Lejon | 340/151 R |
| 3,516,063 | 6/1970 | Arkin | 340/163 R |
| 3,731,277 | 5/1973 | Krutz | 340/163 R |

*Primary Examiner*—Harold I. Pitts
*Attorney, Agent, or Firm*—Young & Thompson

[57] ABSTRACT

A system for interrogating a plurality of remote stations over the telephone company network to obtain information such as the readings of one or more consumer meters at each such station, which may be the house of a consumer. The system may operate on a frequency division multiplex or time division multiplex basis and includes interrogation apparatus located at a telephone company central office and meter readers, responsive to instructions from the interrogation apparatus, located at remote stations having lines terminating at the central office. A central data processor may be connected to several interrogation apparatuses each in turn connected to an associated plurality of remote readers.

38 Claims, 8 Drawing Figures

INTERROGATION OF REMOTE STATIONS VIA AUTOMATIC DIALLER

FIELD AND SUMMARY OF THE INVENTION

This invention relates generally to a system for interrogating a plurality of remote stations to obtain information such as the reading or readings of one or more meters at each such station registering the use of such consumables as electricity, gas, water and oil, and more particularly to interrogation apparatus and to apparatus for use in the remote station. The system may, however, also be employed in the interrogation of equipment other than meters for the collection of other information.

A particular system described hereinafter comprises an interrogator connected to and possibily located at a telephone exchange and a plurality of remote readers connected to telephone lines at respective subscriber installations, each reader being arranged, in response to a command sent by the interrogator over the associated telephone line, to read the outputs of one or more meters and to transmit the reading or readings over the associated telephone line to the interrogator.

The system may further comprise a central data processor connected to and controlling a plurality of the interrogators each in turn capable of addressing a plurality of the remote readers.

According to one aspect of the invention, apparatus for the interrogation of a plurality of remote stations comprises a digital computer, automatic calling means connected to the computer and responsive to an instruction from the computer to cause the establishment of telephonic contact with any selected one of the remote stations, output means connected to the computer and responsive to an instruction from the computer to generate and transmit to the selected remote station a coded interrogation signal arranged to promote the transmission of an information-carrying response signal from the remote station, the output means including means for selectively coding the interrogation signal according to the computer instructions to cause the response signal to include information from a selected one of a plurality of sources of information available at the selected remote station, and input means connected to the computer and operative to receive the response signal.

The computer may be programmed to cause sequential interrogation of a plurality of or all of the remote stations, and to interrogate one or more or all of the sources of information at each station.

The interrogation apparatus may be provided with interface equipment for connection either directly or via a telephone line or circuit to a central data processor unit. Such unit may control the operation of the computer and may also be used to centrally store information such as account numbers and telephone numbers and to supply such information to the computer for use when required. The computer can store the meter readings or other information it collects and can print it out, if desired, in the case of meter readings, in the form of individual bills. Alternatively, the information can be transmitted back to the central data processor unit either as it is collected or as requested after accumulation and storage.

The provision of a central data processor unit renders the interrogation apparatus more flexible; its cycle of operation can be varied and normal operation can be interrupted to take a special reading.

According to a second aspect of the invention, there is provided apparatus responsive to the receipt of an interrogation signal from an interrogator connected thereto by a line to encode information for sending back to the interrogator, comprising an input register for receiving a digital interrogation signal, a gating network having inputs connected to examine at least two stages of the register and responsive to the digits of the interrogation signal in said stages to provide a signal at an output terminal if the coding of said digits is such as to indicate that a source of information available to the apparatus is to be interrogated, and encoder means connected to the output of the gating network and responsive to said signal to encode said information into a response signal for sending back to the interrogator.

According to a third aspect of the invention, there is provided apparatus responsive to the receipt of an interrogation signal from an interrogator connected thereto by a line to encode a response signal for sending back to the interrogator, comprising data selector gating means having an output and a plurality of inputs for connection to at least one source of digital information to be encoded, a counter having outputs connected to the data selector gating means for causing the inputs of the latter to be connected to the output of the latter in a predetermined sequence, and means responsive to the receipt of an interrogation signal to initiate operation of the counter so that a serial stream of encoded information will appear at the output of the data selector gating means. The interrogation signal supplied on the line, which is generally a telephone line, may be in the form of a plurality of simultaneous tones if the apparatus is operative on a frequency division multiplex (FDM) basis, or in the form of a keyed signal tone or two frequency-shifted tones if the reader is operative on a time division muliplex (TDM) basis. The response signal, which may represent the reading of a meter or of a selected one or more of a plurality of meters, may also include remote station identification data such as a consumer's account number.

The invention may be more readily understood from the following description of a remote meter reading system and of alternative forms of interrogators and remote readers suitable for use therein. The system is shown in the accompanying drawings, in which:

DESCRIPTION OF THE PREFERRED EMBODIMENTS GENERAL SYSTEM DESCRIPTION

Figure 1:
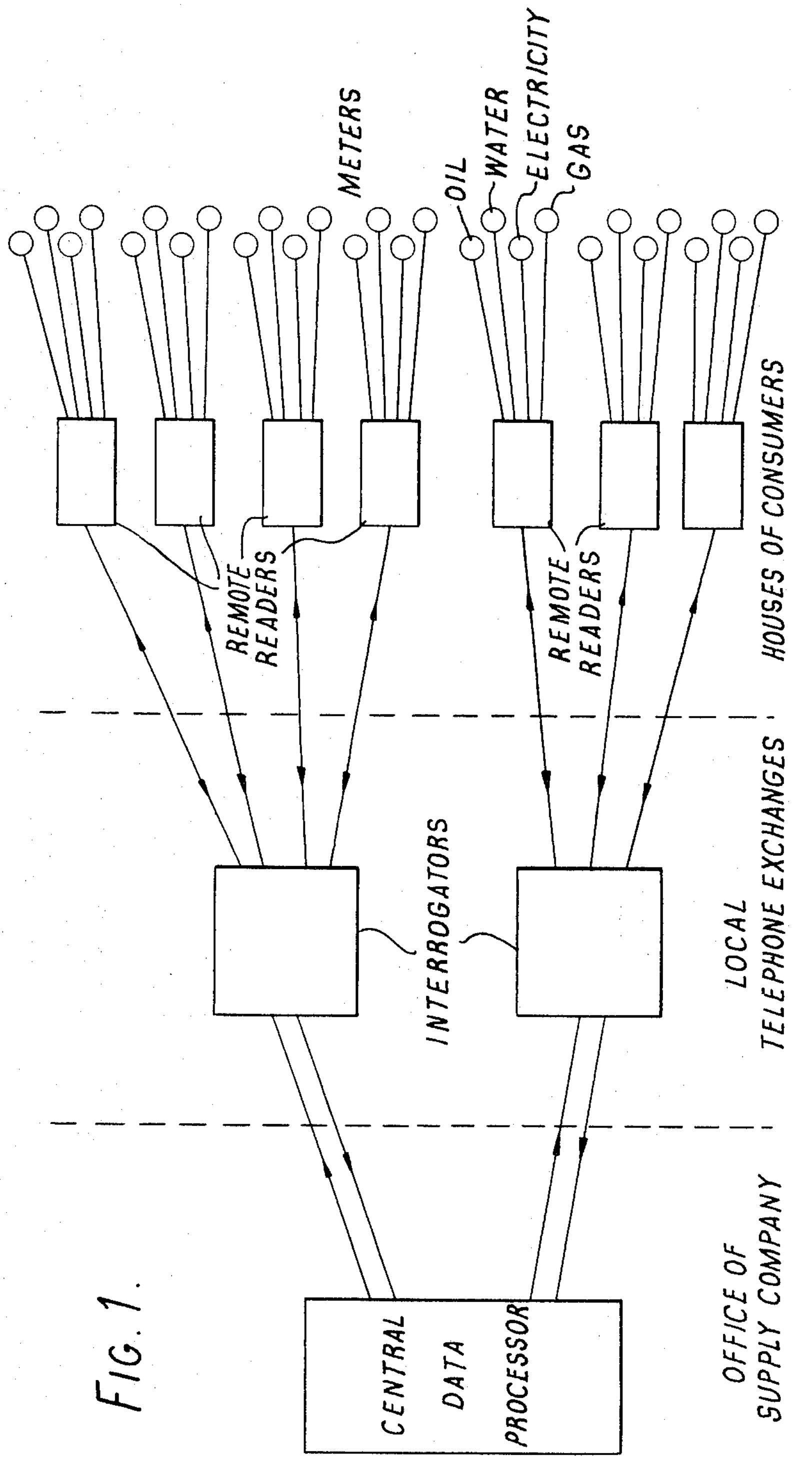
FIG. 1 is a schematic view of the complete remote meter reading system.

The system shown schematically in FIG. 1 is for conveying meter readings in coded binary form from a plurality of remote readers at out-stations which may be domestic or other consumer premises to a number of interrogators and from these to a central data processor.

Each interrogator is located at or at least electrically connected to a telephone exchange (central office) and is capable of addressing any reader connected to a line terminating at such exchange.

Each reader is connected both to a telephone line terminating at the exchange concerned and to a meter or meters at the premises registering, for example, the consumption of one or more of water, gas, electricity or fuel oil. A meter may be provided with an array of ON-OFF contacts which provide a binary coded indication of its reading in any suitable code, e.g., in binary coded decimal (BCD). Alternatively, the meter may send out a stream of pulses as it registers consumption, e.g., from a single contact set arranged to open and shut as the meter operates.

The central data processor of FIG. 1 is not essential to the operation of the system; a smaller scale system comprising a single interrogator and its associated readers may be used. The mode of operation of the system of FIG. 1 is preferably variable to afford different routines so that the interrogators may act on instructions from the central processor or independently, in which latter case output information comprising account numbers and meter readings are recorded on a data logger or on punched tape or magnetic tape.

The link between the interrogators and the readers is the public switched telephone system. At each subscriber's address the reader is connected to the telephone line. Contact with a selected subscriber is established in the normal way via the Post Office's (telephone company's ) switching circuits by a dialling code generated within the interrogator; the telephone ringing tone is meanwhile inhibited. The remote reading system does not interrupt a telephone conversation on the line, and in the event of a subscriber wishing to use the telephone while the meter reading system is operating, the equipment releases the line and allows the subscriber to make a call. It is anticipated that in most future housing developments, such as new towns, all houses will be wired for the telephone service even though all householders may not wish to rent terminal equipment. This is advantageous in that installation of the present system is greatly simplified.

Having selected a line to a particular reader, the interrogator sends an instruction signal in the form of one or more tones which promote a response from the reader. The response signal comprises an account number and the required meter-reading data and is sent in the form of a tone signal back along the line to the interrogator. This signal is detected by the interrogator and after two such transmissions of the whole signal, i.e., a repeat of the account number and data, the words are compared for agreement with each other and with the account code for which the interrogator has sought the information. The response signal may be sent directly back to the data processor or may be stored for sending back later, for example with a number of other stored response signals from other consumers. Alternatively, the response signal may be logged at the interrogator and, if required, printed out, possibly in the form of a bill.

The central data processor unit is a general purpose processor and, depending on the size of the system, may take a variety of forms, from a dedicated small processor with the necessary peripheral equipment, to a large computing system which only processes paper tape, or magnetic tape, produced by the interrogator. For small or partly-installed systems, it may be more economical to buy time on a large machine.

The central data processor has suitable input/output facilities coupled to the system via an interface to transmit and collect data from the interrogators. The interface converts the parallel data from the computer into serial data which is transmitted to the interrogators either directly or via a Post Office (telephone company) approved modem (modulator/demodulator). Similarly, serial data is received from the interrogators and converted to parallel words suitable for entry into the computer. The data transmission system can work in the full duplex mode. The processing system is capable of scaling, logging and storing all input data as well as being able to generate the command words required from the stored information.

The interrogator used in the system of FIG. 1 has facilities for accepting and giving commands to both the central data processor and to the remote reader to which it is currently connected. This unit can be said to regulate the speed of the system and also to facilitate time-sharing of the central data processor by all of the interrogators.

The interrogator is based on a small computer which is used to preform the logic control and to initiate the functions of the unit as well as to store a number of commands which are to be performed sequentially. The remaining part of the interrogator comprises a number of settable and clearable registers for holding instructions and data as well as shift registers for converting the serial input into a parallel word suitable for reading by the computer. The logic for controlling events is contained in the timing circuits.

FDM INTERROGATOR

Figure 2A:
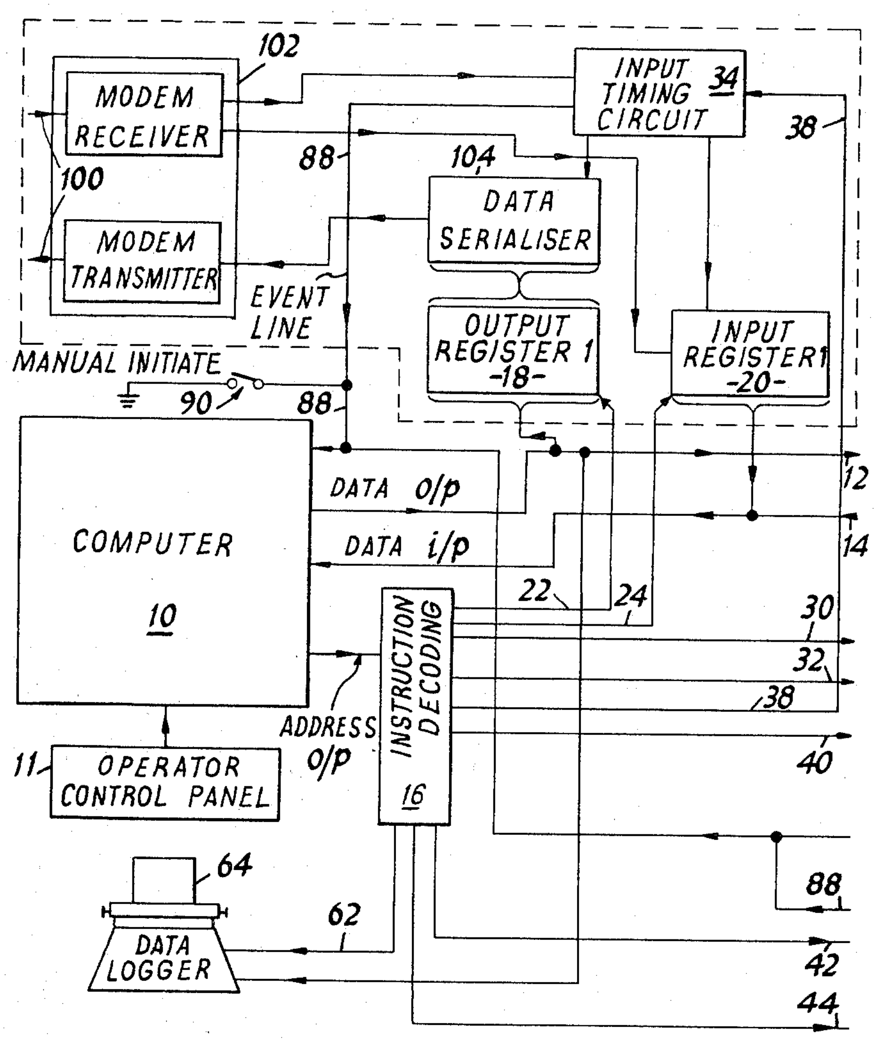
FIGS. 2A and 2B together form a circuit diagram of an FDM interrogator suitable for use in the system of FIG. 1, FIG. 2B being a continuation of the right hand side of FIG. 2A.
Figure 2B:
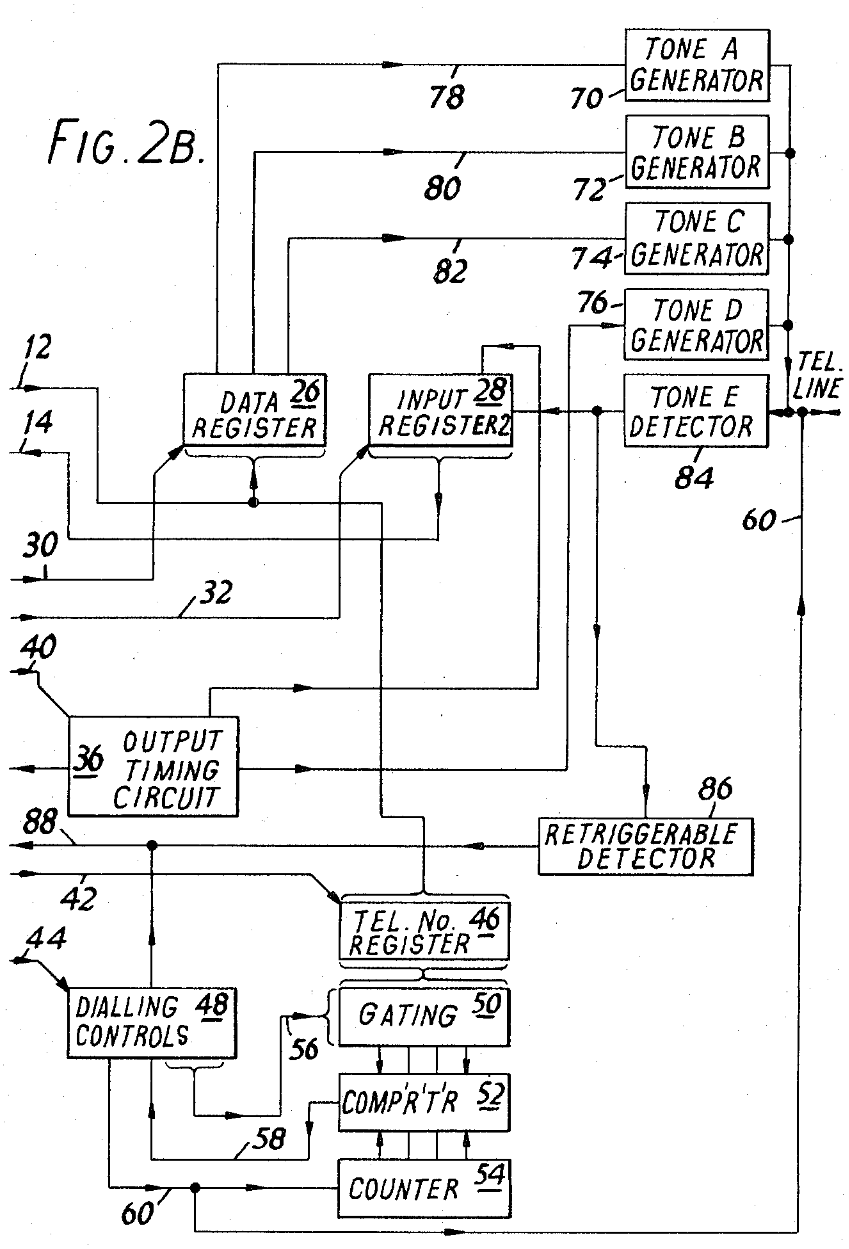

An interrogator which can be used in a system employing FDM communication between the interrogator and the readings is shown in FIGS. 2A and 2B. The interrogator may function in a set cycle mode, independently of any central data processor, or it may operate in a variable cycle mode under the control of such a processor. In the former case, the parts of the apparatus bounded by dotted lines in FIG. 2A and the connections to such parts are not provided. The interrogator of FIGS. 2A and 2B comprises a stored-program digital computer 10. A suitable computer is the MINIC 1 computer manufactured by Micro Computer Systems Limited of Working, Surrey, England. An operator control panel 11 and a keyboard are provided for programming and supervisory purposes. The computer has data output and input terminals connected to data highways 12 and 14, respectively, and an address output connected to and instruction decoding circuit 16.

The instruction decoding circuit 16 controls the operation of the interrogator in accordance with instructions sent out by the computer 10. It controls registers 18 and 20 via lines 22 and 24, respectively, when the interrogator is communicating with the central data processor, and it controls registers 26 and 28 via lines 30 and 32, respectively, when the interrogator is communicating with a remote reader. The registers 20 and 28 are connected to the data input highway 14 for feeding data into the computer when instructed from the central data processor or remote reader, respectively, and the registers 18 and 26 are connected to the data output highway 12 for reading data supplied from the computer when instructed for transmission to the central data processor or remote reader, respectively.

The instruction decoding circuit 16 also controls operation of input and output timing circuits 34 and 36 via respective control lines 38 and 40. Further outputs from the instruction decoding circuit 16 on lines 42, 44 are for feeding a BCD telephone number from the computer into a further register 46 and for operating dialling controls 48, respectively, for establishing contact with a selected remote leader. The contents of the telephone number register 46 and gated in parallel by a gating network 50 to a comparator 52 for comparison with the outputs of the stages of a counter 54. The dialling controls 48 are connected to the gating network 50, the comparator 52 and the counter 54 by respective control lines 56, 58 and 60, the latter line also being connected to the Post Office (telephone company) line for sending out dialling pulses to establish contact with a selected reader.

Another control connection from the instruction decoding circuit 16 is made over a line 62 to a data logger 64; the logger is also connected to the data output highway so as to log the data thereon when instructed by a signal on the line 62.

Four tone generators 70, 72, 74, 76 which provide different output frequencies A,B,C and D lying within the passband of the telephone system, i.e., 300–3,400 Hz, are provided for sending an FDM signal to a remote reader for interrogating it. The tones of the generators 70, 72, 74 are selectively present or not in accordance with the state of the stages in the register 26 as indicated by the control lines 78, 80, 82. The tone D generator 76 is enabled by the output timing circuit 36 which also controls the input register 28.

A detector 84 responsive to a fifth frequency E also within the telephone system passband and at which response signals are sent by the reader is connected to the line output to receive such signals. It is connected to feed the response signal into the input register 28 in serial fashion. A retriggerable detector 86 is connected to receive the output of the detector 84 and is responsive thereto to provide a signal on a so-called event line 80 connected to the computer. If the response signal from the reader is lost as by the subscriber initiating a call, or no response signal is received due to a line or reader fault, the resultant signal applied by the detector 86 to the event line interrupts the computer. The event line 88 is also connected to the input and output timing circuits 34 and 36, the dialling controls 48 and a manual initiate key 90.

Connection of the interrogator to a line 100 leading to the central data processor is by means of a Post Office (telephone company) approved modem 102, unless the connection is sufficiently short for the modem not to be necessary. The modem receiver output is connected to the input timing circuit 34 and to the input register 20. The output from the register 18 is connected to a data serialiser 104 which is strobed or clocked, like the input register 34. The output of the serialiser 104 is connected to the modem transmitter.

The manner of operation of the FDM interrogator in the set cycle mode, i.e., in which it is independent of any central processor unit, will now be described. As mentioned before, an interrogator arranged for operation in this manner will not be provided with those elements shown within dotted lines in FIG. 2A or with the connections to such elements.

The interrogator sequentially interrogates a plurality of readers in accordance with instructions programmed in the computer 10. The program and thus the sequence is started by an earth applied to the event line 88 either manually by means of the manual initiate key 90 or automatically by a real time clock.

The operation of the interrogator in interrogating a selected reader will now be described. Once the program is started, the computer calls up the various information it requires, i.e., the subscribers telephone number, account number and which meter is to be read. It then initiates the "dial" routine in which the telephone number of the subscriber having the selected remote reader, is fed in BCD form into the telephone number register 46 and the dialling controls 48 are instructed to establish connection with the reader by pulsing the line and thereby effectively dialling the number. In a typical application the interrogator is connected to and located at a local telephone exchange (central office) and the number will therefore, at least in some countries, be a four or five digit number, for example. The dialling controls 48 semi-short-circuit the line 60 to start the call and thereafter feed open-circuit dialling pulses into such line. The counter 54 counts the pulses going out for each digit, the counter output being compared by the comparator 52 with the contents of the register for the appropriate digit by the gating network 50 to ensure that the correct number of pulses is sent for each digit. The comparator 52 causes stepping to the next digit when the correct number of pulses has been sent, for one digit by interrupting the dialling pulses for the necessary interval and clearing the counter 54.

When the number of the selected reader has been dialled, the computer is informed by a signal applied to the event line 88, and the computer then advances to the "read" routine of the program. In this routine, an interrogation signal is sent to the reader to cause reading of the selected meter. The interrogation signal is a composite FDM signal made up of tones selected from the generators 70, 72, 74, 76. A timing instruction is given to the output timing circuit 36 to start its cycle which involves sending control pulses to the tone D generator 76, and data fed into the register 26 by the computer 10 is used to control the other three tone A, B and C generators. Tone A acts as an enable signal to energise the reader, the possible combinations of presence or absence of tones B and C identify the selected meter from the four possibilities, and tone D acts as a control signal for the reader. Once the interrogation signal has been sent out, the computer 10 checks that the retriggerable detector 86 is set to respond to a reply signal, and then waits for a reply signal to arrive.

Once the remote reader has determined which meter is to be read, it sends a response signal to the interrogator in the form of a series of pulses of the tone E which are fed serially into the input register 28. When the start bit of the response signal or word arrives and is detected by the retriggerable detector 86, the output timing circuit 36 applies clock pulses to the register 28 so that the signal is clocked therein.

Instructions to inspect the input register 28, to load the output data register 26 and to start the various timing sequences are generated by the computer 10. These appear as addressing instructions and are decoded by the circuit 16 at appropriate times in the program cycle, activating the various registers and timing circuits.

As described above, the response word or signal from the reader, which comprises pulses of the tone E, is detected by the tone E detector 84 and becomes the data for the input register 28. When the word is complete the output timing circuit 36 interrupts the computer via the event line 88 causing the word to be read into the computer store. The signal offered to the event line 88 causes resetting of the output timing circuit 36 so that the data from the remote reader is collected again, thus allowing a comparison between the two readings to be made by the computer. This procedure is repeated a set number of times, determined by the program, or until agreement is achieved. Agreement allows the program to transfer the information into store in a location relevant to the account number. In accordance with the program in use, the computer 10 then either repeats the above "read" routine to read another meter at the same location, or instructs the dialling controls 48 to release the line and to reload the telephone number register 46 thus starting a new cycle of operation for a fresh remote reader.

The manner of operation of the interrogator when operating in the variable cycle mode, i.e., when operating under control of the central data processor, will now be described. This mode of operation is an extension of the above-described set cycle mode and requires a change of program and the extra hardware shown within dotted lines in FIG. 2A. The program is broken into an executive and various sub-routines. The executive controls the sub-routines and stores the operating statuses i.e., receive commands, collect data, transmit data, etc. These statuses indicate to the executive the position reached in the cycle of operation.

Initially the interrogator receives commands in the form of serial words from the central data processor via the modem 102, or, if only a short link is involved, over local cables. These words contain an operation instruction as well as an account code or number and the telephone number if necessary. In a system where one interrogator is used to read several thousand meters it may be more economical to store all account numbers at the central data processor unit on peripheral storage units rather than to increase the storage capacity of the interrogator.

Under these conditions the sequence of data collection is determined by the central data processor unit thus giving the facility of sequence changes and priorities.

Each input command word has parity check bits which are treated as a part of the word so that the computer can check the parity. On receipt of the start bit of this word by the interrogator the input timing circuit 34 controls the collecting of the data from the modem receiver into the input register 20. When the parity of the word in the input register 20 is proved by the computer 10, a reply word is fed by the computer into the reply register 18 and the timing circuit 34 is initiated from the computer 10 via the instruction decoding circuit 16. The timing circuit 34 operates the data serialiser 104 to convert the parallel word from the register 18 into a suitable serial form for transmission back to the central processor unit. This reply instructs the central processor to retransmit the word if the parity is wrong or to send the next instruction if the parity is correct.

After acceptance of the word by the interrogator, certain bits are inspected by the computer 10 to ascertain whether the instruction must be immediately executed or stored. These instructions will initiate the sending of data or end of message sequences.

When all instructions have been received the computer switches into the data collection mode and cycles through the instructions in the same way as outlined in the fixed set cycle mode of operation described above. On completion of the data collection sub-routine the interrogator waits for the central data processor to request the data collected at which time it enters the transmit data mode and sends the information to the central data processor.

FDM REMOTE READER

Figures 3, 3A:
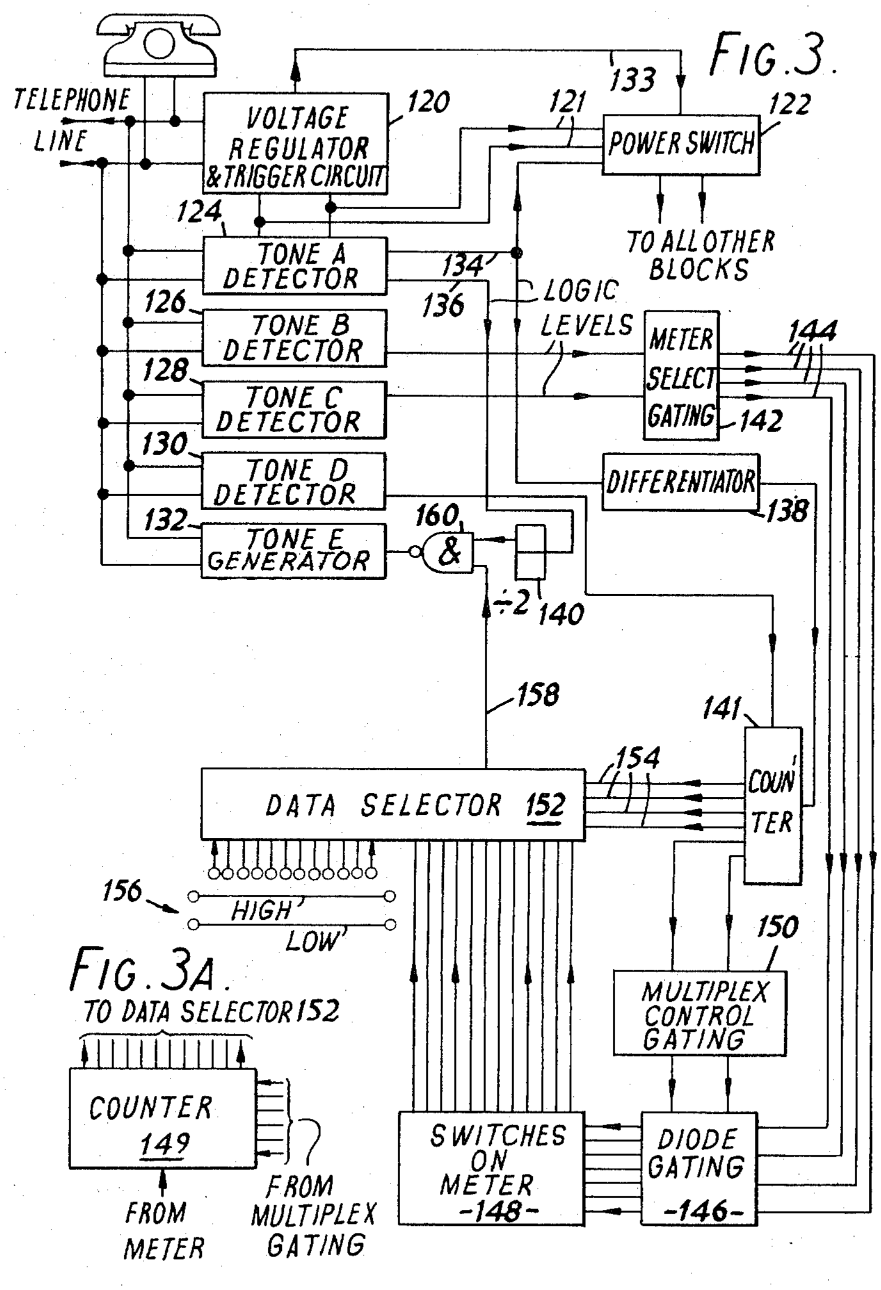
FIG. 3 is a circuit diagram of an FDM remote reader suitable for use in the system of FIG. 1 in conjunction with the FDM interrogator of FIGS. 2A and 2B.
FIG. 3A shows a modification of the remote reader of FIG. 3, for use with a different kind of meter.

A remote reader suitable for use with the FDM interrogator described above with reference to FIGS. 2A and 2B is shown schematically in FIG. 3.

The reader is wired across the incoming Post Office (telephone company) telephone line in parallel with the telephone instrument, i.e., if one is provided. The reader draws power over the line from the exchange (central office) battery and is provided with a voltage regulator 120 to compensate for the varying input voltage due to line loss. The regulated output voltage of the regulator 120 is connected directly by lines 121 to a power switch 122 and to a tone A detector 124 which is connected across the line together with tone B, C and D detectors 126, 128 and 130, respectively, and a tone E generator 132, the tones A – E being the same as the corresponding tones referred to in the description of the interrogator of FIGS. 2A and 2B. The detector 124 and the regulator 120 are the only parts of the reader which are permanently energised by the central battery voltage when it is applied to the line; the other circuits are energised by the switch 122 in response to the presence of tone A on the line from the interrogator and current drain when the reader is not in use is therefore minimised.

The voltage regulator 120 includes a trigger circuit responsive to the line voltage. Whenever the line voltage is low, due to the telephone handset being lifted and a substantial current being drawn, the trigger circuit disables the power switch via a line 133, whereby the reader is rendered inoperative.

Outputs from the tone A detector 124 are connected over lines 134 and 136 to the power switch 122 and a differentiator 138, and to a divide-by-two bistable circuit 140, respectively. The outputs from the differentiator 138 and from the tone D detector 130 are both passed to a counter 141.

The outputs from the tone B and C detectors 126, 128 are connected to a meter select gating network 142; each of the four possible combinations of presence or absence of these two tones causes a signal to be applied to one of four meter select lines 144 to select the appropriate meter. This allows four meters to be catered for, typically those registering the consumption of electricity, gas, water and oil. It will be evident that the system can readily be modified by the addition of one or more further tones, for example, so as to cater for more than four meters.

The meter select output lines are connected via diode gating 146 to switches 148 on the meters and to multiplex control gating 150. The diode gating 146 is provided to prevent interaction between the meter switches 148. The block 148 in FIG. 3 represents the switches for one meter only; a corresponding set of switches for each other meter is connected to the diode gating 146 and to data selector gating 152 (see below) in the same manner as for the switches 148 which are shown.

Each meter has up to six decimal reading digits and is arranged to produce a 24 digit BCD or other binary output for the reader. The output is mechanical and comprises 24 sets of contacts each movable from open to closed positions in accordance with the meter reading. The contact sets are arranged in pairs, one contact of each set in the pair being connected to one contact of the other set. The contact sets are connected both to the multiplex control gating 150 via the diode gating 146, and so as to provide data inputs for a data selector gating means 152 which is controlled by the counter 141 by means of conductors 154 connected to the individual stages of the counter.

The data selector gating means 152 is for serialising data for transmission back to the interrogator and is provided with further inputs from an account number patching arrangement 156. This arrangement comprises a pair of conductors at the high and low logic levels and means for strapping certain gates of the gating system 152 to either of these levels to provide a unique hard-wired digital representation of the account number of the particular subscriber. Alternatively, if the type of logic in which an open circuited input provides a given logic level is used, only those gates required to be at the other level need to be wired to a fixed level. This fixed level may be earth.

A serial output of the data selector gating system 152 is connected by a line 158 to one of two inputs of a NAND gate 160, a second input of which is connected to an output of the bistable circuit 140. If the voltage regulator 120 did not include a trigger circuit for detecting when the line is being used, a third input of the gate 160 could be connected to the telephone instrument to disable the gate when the handset is lifted.

FIG. 3A shows a modification of the reader for use with a meter which does not have the set of switch contacts 148, but a single pulse output. This output is connected to the input of a counter 149 in the reader to register consumption. The states of the stages of the counter are multiplexed to form a reply word for sending back to the interrogator.

The manner in which the remote reader of FIG. 3 responds to an instruction from the interrogator to read one or more meters and to transmit the reading or readings back to the interrogator is as follows.

The tone A detector 124 detects the presence of the enable tone A in the instruction signal and applies a signal to line 134 which causes the power switch 122 to apply power to the remainder of the reader and the differentiator 138 to zero the counter 141. The tone A detector also supplies a signal to the divide-by-two bistable circuit 140 via the line 136, which signal will be at the frequency of tone A, which may be, for example, 2 kHz. The resultant 1 kHz square wave output of the circuit 140 is applied to the gate 160 and thereafter to the tone E generator 132. This generator is a square wave to sine wave convertor and provides a 1 kHz sinusoidal output comprising tone E.

It will be appreciated that this arrangement obviates any need for an oscillator in the reader in that tone E is generated by using the incoming tone A. However, the tone E generator could include an oscillator, if required, in which case the line 136, the divide-by-two circuit 140 and the gate 160 would be dispensed with.

The tone B and C detectors 126 and 128 detect the presence or absence of these tones and apply corresponding binary levels to the message select gating network 144 which applies a signal to one of the four conductors 144 so that the gating 146 selects the desired meter. A given logic level is applied by the gating network 146 to the 12 pairs of contact sets in the selected set of meter switches 148 and this level is or is not transmitted to the other ends of the sets according to whether they are open or closed. The multiplex control gating 150 initially gates twelve of the 24 free ends of the contact sets to the data selector register 152. The reader is then ready to start transmitting the meter reading back to the interrogator.

Pulses of tone D which are then transmitted by the interrogator cause the tone D detector 130 to produce pulses for incrementing the counter, with the result that the contents of the data selector register 152 are serially passed out via the conductor 158 and the gate 160 to the tone E generator 132, the generator producing corresponding pulses of tone E for transmission to line. When the data corresponding to the twelve sampled contact sets has been transmitted, as indicated by the counter 141 reaching a predetermined count, the counter is operative on the multiplex control gating 150 so that the other twelve contacts are sampled in like manner and also transmitted; the complete data transmitted, i.e., the reply word, comprises the total meter reading as represented by 24 bits and the account number.

The interrogator reads the reply word and the computer requests its retransmission for checking the data. The request is indicated by a momentary interruption of the enable tone A, the differentiator 138 being responsive thereto to pulse the zeroing input of counter 141 to zero it and thereby reset the timing so that the above-described operation is repeated. The interrogator can repeat the operation as many times as required until the computer is satisfied the reading is correct by following the same procedure of momentarily interrupting the enable tone.

Once the interrogator has accepted the reply word as correct it may then break contact; the enable tone will clear and the power switch will de-energise the reader. Alternatively, another meter or meters may be first read by following the above-described procedure of momentarily interrupting the enable tone A, but also changing the tones B and/or C to select the new meter.

TDM INTERROGATOR

Figure 4:
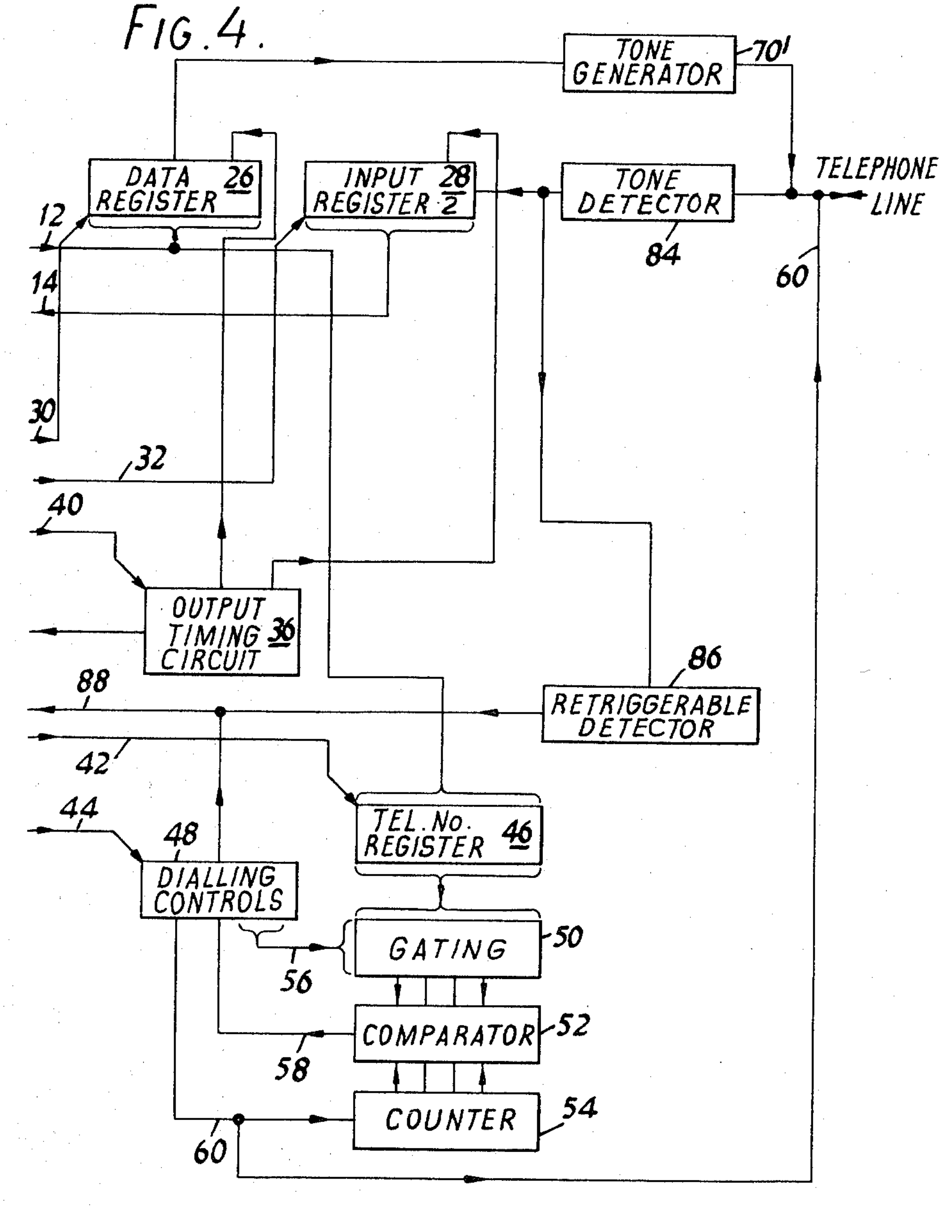
FIG. 4 forms, together with FIG. 2A, a circuit diagram of a TDM interrogator suitable for use in the system of FIG. 1, this Figure, like FIG. 2B, being a continuation of the right hand side of FIG. 2A.

The circuit diagram of an alternative interrogator for use in a TDM system of the kind shown in FIG. 1 is shown, in part, in FIG. 4. The remaining part of the circuit diagram is the same as FIG. 2A, FIG. 4 being a continuation of the right hand side of FIG. 2A.

The interrogator of FIGS. 2A and 4 is identical to that of FIGS. 2A and 2B in a large number of respects and the following description of its construction and operation covers only the points of difference. In FIG. 4, the same reference numerals are employed as are used for corresponding elements in FIG. 2B.

The four tone generators of the FDM interrogator are replaced here by a single tone generator 70′ which is frequency shift keyed (FSK) by the serial output of the data register 26 before transmission to line. It transmits a burst of 1,000 Hz to indicate the digit O and of 1,300 Hz to indicate the digit 1, spaces being provided between the bursts. The output timing circuit 36 controls the data register 26 instead of the tone D generator as in FIG. 2B as in this form of interrogator the control signals are not supplied by a separate tone but by digits occupying specific places in the time multiplex of bits assembled in the register 26. The multiplex or transmitted instruction word is made up of eight bits in the following order: a 101 identifying start-of-word group, an enable bit, two meter select bits and a final 00 end-of-word group. The word is transmitted at 400 bauds.

Once the instruction word has been fed into the data register 26 by the computer 10 over the data output highway 12, the output timing circuit 36 is instructed to feed eight clock pulses to the data register so that the word is transmitted to the reader. The output timing circuit 36 then waits, and when the retriggerable detector 86 indicates that a reply from the reader is being received, the timing circuit feeds a single clock pulse to the input register 28 to clock in the reply, which is in the form of a single bit. The same instruction word is then sent out again and the second bit of the reply word is obtained. This operation is repeated until the whole reply word has been received and stored. The whole cycle is then repeated to cause retransmission of the whole reply word for checking purposes.

TDM REMOTE READER

Figure 5:
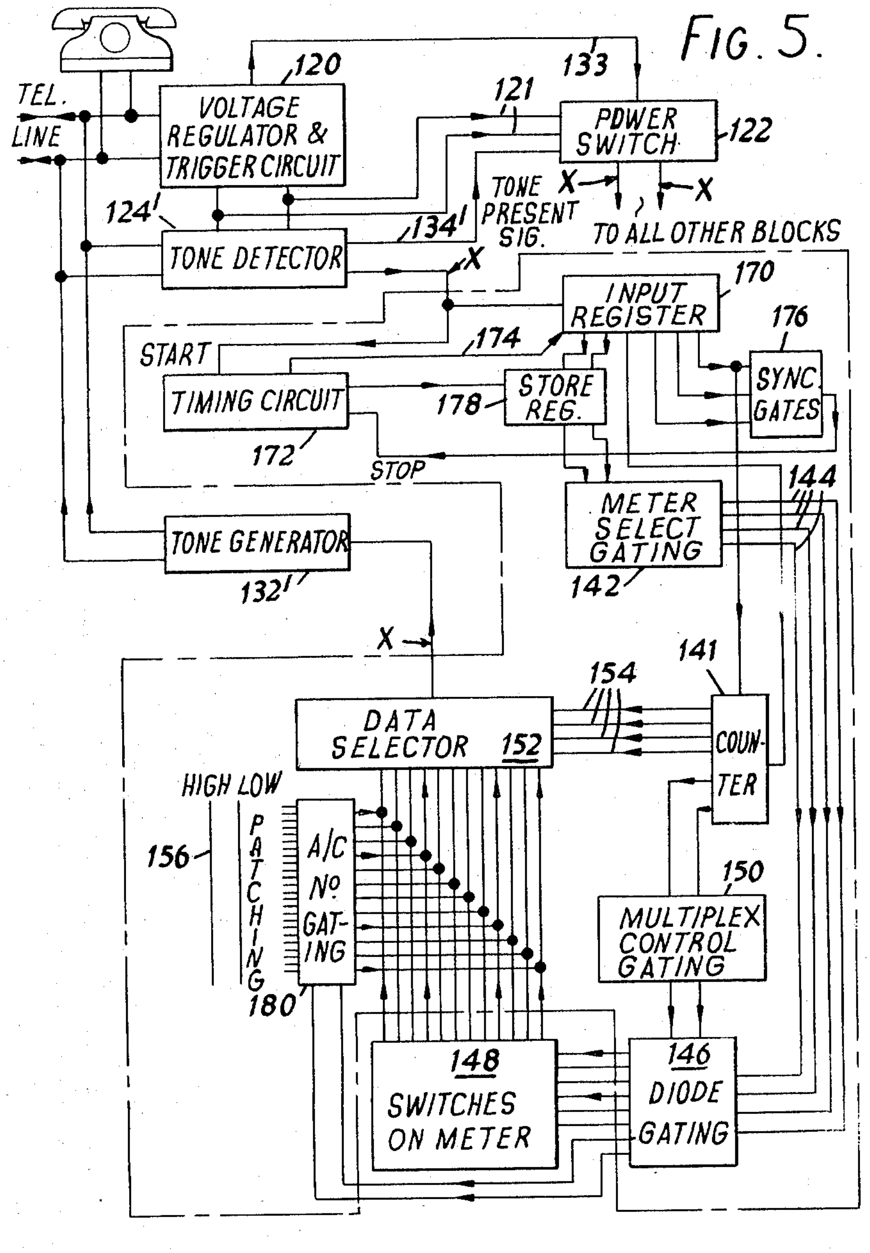
FIG. 5 is a circuit diagram of a TDM remote reader suitable for use in the system of FIG. 1 in conjunction with the TDM interrogator of FIGS. 2A and 4.

The circuit diagram of a remote reader suitable for use with the TDM interrogator of FIGS. 2A and 4 is shown in FIG. 5. This reader is similar to the reader of FIG.3 in many respects and the following description of its construction and operation is restricted to the points of difference. In FIG. 5, the same reference numerals are employed to denote items corresponding to items in FIG. 3.

An FSK tone detector 124′ converts the received TDM instruction word, which is in the form of a train of bursts of 1,000 and 1,300 Hz into binary digits for serial entry into an input register 170; the binary digits are also applied to a timing circuit 172. The very first received bit arriving at the timing circuit 172 causes clock pulses to be fed from the timing circuit via conductor 174 to the register 170 to enable the binary signals therein to be clocked therein. The end three stages of the register are connected to synchronising gates 176, the next stage to the zeroing input of the counter and the next two stages to respective stages of a store register 178. The outputs of the store register 178 are connected to the meter select gating network 142. The end stage of the register 170 which is connected to the synchronising gates 176 is also connected to the input of the counter 141.

Whenever an input instruction signal is present, a signal on a line 134′ causes the power switch to apply power to the reader; when a signal is not present, only the voltage regulator 120 and the tone detector 124′ are powered.

The data selection and gating arrangement is substantially the same as that of FIG. 3. One small difference resides in the account number reading arrangement; an account number diode gating network 180 controlled by the diode gating network 146 is provided here so that the account number can be gated on to the same inputs as used for the meter reading or readings. It will be readily appreciated that this differing arrangement could be used on the FIG. 3 reader is required and that the arrangement of the FIG. 3 reader could be used here.

The serial output of the data selector gating means 152 is connected to a tone generator 132′ which transmits bursts of 2,100 Hz when it is fed with the digit 1 and of 1,700 Hz when fed with the digit 0.

The TDM reader of FIG. 5 can be modified in the same manner as can the FDM interrogator of FIG. 3, as shown in FIG. 3A, for use with a meter supplying a serial stream of output pulses.

The reader of FIG. 5 operates as follows. As soon as the tone detector 124′ detects the present of an FSK instruction signal from the interrogator it applies a signal to the line 134′ which causes the power switch 122 to apply power to all the circuits.

The bits from the output of the tone detector 124′ are fed to the timing circuit 172 which derives clock information from the incoming signal and applies clock pulses over line 174 to the input register 170 causing the received word to be fed therein. The synchronising gates 176 detect when the word is fully fed into the register 170 by recognising the 101 start-of-word group and stop the timing circuit 172 from supplying clock pulses to the register 170. The stored enable bit is at this time connected to the counter and the stored meter select bits are connected to the store register 178. The enable and meter select information is used as in the embodiment of FIG. 3, the enable bit being changed for one word whenever the counter 141 is to be zeroed, i.e., at the start of every fresh response signal.

The first bit of every instruction word is applied to the counter 141 and the counter therefore increments its count by unity whenever it recognises the 101 start-of-word group of synchronising bits. The instruction word is therefore repeatedly sent and one bit of the reply word is sent to the interrogator for each transmission of the instruction word. The reply word is therefore transmitted at 25 bauds.

As with the interrogator of FIGS. 2A and 2B, the reply word may be repeated and other meters read by zeroing the counter 141. This is done by changing the enable bit for one transmission of the instruction word, as described above.

The remote readers of FIGS. 3 and 5 and particularly that of FIG. 5 may be engineered as integrated circuits using large scale integration (LSI) so that they are cheap and easy to mass produce in the large quantities required for domestic installation.

It is contemplated that a reader may be fitted inside a telephone. Alternatively, the reader may be separated into several parts for convenience of installation in typical consumer premises; this may involve certain parts of the reader being duplicated.

One such reader which is a modification of that of FIG. 5 will now be described. The modified reader is essentially the same as that shown in FIG. 5, with the exception that the parts thereof within the chain-dotted lines are duplicated for each meter and are fitted to or inside of their respective meters, preferably in the form of unitary modules which may comprise LSI integrated circuits. These modules will be referred to hereinafter as "logic modules."

The remaining parts of the reader are also preferably manufactured as a unitary module which also may comprise an LSI integrated circuit and which will be fitted at a convenient location in the consumer's premises. This module will be referred to hereinafter as the "communications module."

The four points where the communications module interconnects with the logic module or modules are each designated as X on FIG. 5. These four interconnections are made by four wires connecting together on a wired-OR basis, by plugs and sockets, for example, so that all the logic modules have access to the communications module.

The logic modules differ slightly from the corresponding part of FIG. 5. The meter select gating 142 has only a single output and will be looped back at each meter. Also, in this case the diode gating 146 will be connected solely to the illustrated switches 148 which are on the associated meter. The meter select gating 142 may be simplified in this reader because, for a particular module, all that has to be determined is whether or not the particular associated meter has been selected.

This modified type of reader is extremely flexible and allows installation in a consumer's premises with a minimum of wiring and inconvenience. In a typical installation, gas and electricity meters which are both located in a meter cupboard, each have a logic module fitted inside them. The communications module is fitted near these meters and is wired to their logic modules by short plug and socket connections. The communications module is also wired by relatively long connections to logic units in water and oil meters which may be at extreme opposite ends of the premises, and to the telephone line.

The FDM remote reader of FIG. 3 may be modified in like manner to form separate communication and logic modules.

The system described above may be installed with a minimum of effort by using existing telephone circuits and is extremely flexible in operation. It will be seen to provide a very satisfactory alternative to the expense and inconvenience of manual meter reading.

Figure 6:
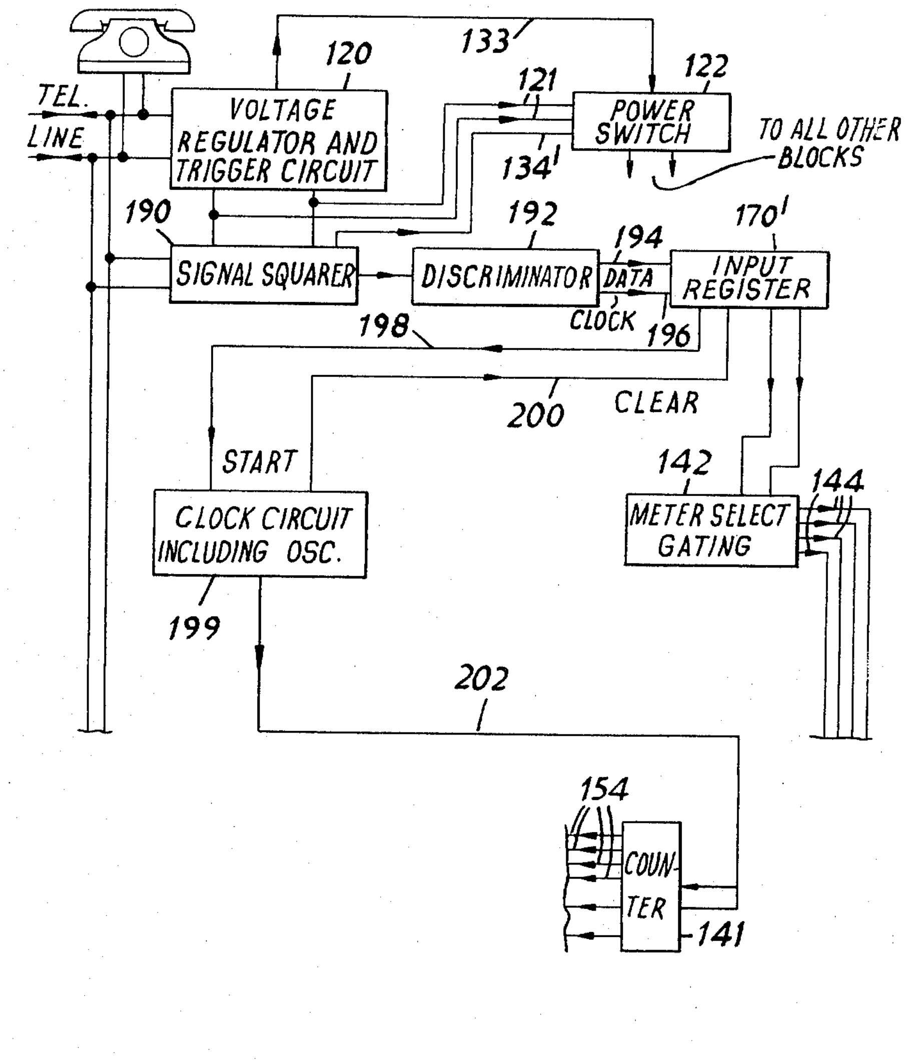
FIG. 6 is a modification of the TDM remote reader of FIG. 5.

A modified form of the TDM remote reader of FIG. 5 is shown in FIG. 6. The voltage regulator and trigger circuit 120 and the power switch 122 are the same as in the reader of FIG. 5, as also are all the parts now shown in FIG. 5.

The instruction word received by the reader is the same as that received by the reader of FIG. 5, i.e., one of eight bits each formed by a tone burst of one of two frequencies. The word is converted into bursts of square waves by a signal squarer 190, and the squared-up signal is digitised by a discriminator 192 which passes data to an input register 170' over a line 194 and clock pulses over a line 196. The input register 170' contains gates arranged to detect the 101 start-of-word group and to send a signal over a line 198 to the START input of a clock circuit 199 which contains an internal oscillator operating at 40.7 kHz. The clock circuit 199 is also connected to the CLEAR input of the input register by a line 200, and to the input of the counter 141 by a line 202.

The reader of FIG. 6 operates as follows. When an instruction word arrives, the signal squarer 190 detects it and causes the power switch 122 to energise the reader. The discriminator 192 converts the squared tone bursts received from the squarer 190 into digital data and passes it to the input register 170' over the line 194. The data is clocked into the register 170' by clock pulses extracted from the word and passed to the register 170' over the line 196. When the gates in the register 170' detect the 101 start-of-word group, indicating that the word has been fed into the register, a START signal is sent to the clock circuit 199 over the line 198, which then sends out a stream of pulses to the counter 141 to cause the reading of the selected meter to be multiplexed together with the account number and sent back to the interrogator, as described before. However, with this reader, the entire reply word is sent back for a single transmission of the interrogator word, due to the counter incrementing pulses being supplied from the reader's internal oscillator. When the clock circuit 199 has sent out the required number of pulses to the counter 141, it stops and clears the input register 170' by applying a signal to the line 200. The reader is then ready to receive the instruction word again for retransmission of the reply word for checking purposes.

In the reader of FIG. 6, divided outputs from the internal oscillator in the clock circuit 199 provide the two frequencies for generating the reply word. The reply tone generator may therefore consist of a gating network responsive to gate one or the other or neither of the two divided outputs to the line, as appropriate.

Although the above system is described with reference to use in readings meters at subscriber premises to avoid the expense of manual reading, the system, or at least parts of it, may be used in other applications. For example, it may be employed where for reasons of hostile environment, security or sheer physical difficulty, manual meter reading is very difficult or prohibited.

Furthermore, the various forms of reader described may be used in applications where a telephone line is not used. For instance, a reader may be connected by a short line to a plug accessible outside of the consumer premises for reading by a portable interrogator. It is anticipated that such a facility may be provided on an interim basis during conversion of a town or area from manual to automatic telephonic meter reading.

The system may be used for reading other sources of information than consumption meters. It may be employed in the remote measurement of other variables such as pollution parameters, reservoir levels and vehicle flow.

We claim:

1. Apparatus for the interrogation of a plurality of remote stations, comprising a digital computer, automatic calling means connected to the computer and responsive to an instruction signal from the computer to generate a dialing signal for application to switching circuits, thereby to establish telephonic contact with a predetermined one of the remote stations via an associated line from the switching circuits; output means connected to the computer and responsive to an instruction signal from the computer to generate and transmit to the predetermined remote station via the switching circuits a coded interrogation signal arranged to promote the transmission of an information-carrying response signal from the remote station, the output means including means for selectively coding the interrogation signal according to the computer instruction with a code representative of a predetermined one of a plurality of sources of information available at the predetermined remote station, whereby a response signal including information from the said predetermined source is transmitted from the predetermined remote station, and input means connected to the computer and operative to receive the response signal.

2. Apparatus as claimed in claim 1, wherein the computer is programmed to cause the output means to transmit a fresh interrogation signal having a different coding once a response signal has been received by the input means, to promote the transmission of a fresh response signal including information from another of the plurality of sources thereof available at the selected remote station.

3. Apparatus as claimed in claim 1, wherein the computer is programmed so as to be operative on the automatic calling means, the output means and the input means to cause interrogation of at least some of the plurality of remote stations in a predetermined sequence.

4. Apparatus as claimed in claim 1, wherein the automatic calling means comprises means for dialling a series of conventional dialling pulses representative of a multi-digit telephone number associated with a selected remote station.

5. Apparatus as claimed in claim 4, wherein the dialling means includes a register connected to the computer for receiving and storing a selected telephone number, means for generating a series of dialling pulses, a counter arranged to count the number of dialling pulses generated, and a comparator connected to compare the first digit of the telephone number stored in the register with the contents of the counter and responsive to their being equal to cause the generating means to temporarily interrupt the series of dialling pulses and to clear the counter, whereby the next digit of the telephone number can be dialled in like manner.

6. Apparatus as claimed in claim 1, including a timing circuit connected to the computer, the input means and the output means and operative to control the operation of the input and output means, the computer being responsive to an indication from the automatic calling means that contact has been established with a selected remote station to initiate operation of the timing circuit.

7. Apparatus as claimed in claim 6, wherein the input means includes an input register connected to receive a digital response signal from the selected remote station and a retriggerable detector also connected to receive the response signal and connected to the computer and responsive to reception of the response signal to indicate such to the timing circuit via the computer, the timing circuit including means responsive to such an indication to supply at least one pulse to the input register for clocking in the response signal.

8. Apparatus as claimed in claim 1, wherein the output means includes means for generating a plurality of tones each within the passband of the telephone system with which the apparatus is to be used, and control means connected to the computer and the generating means and responsive to a computer instruction to cause assembly and transmission of a frequency division multiplex coded interrogation signal formed from the tones.

9. Apparatus as claimed in claim 8, wherein the control means includes a register and the generating means comprises a plurality of generators each for providing a respective one of said plurality of tones and each connected to a respective stage of the register and operative to provide the associated tone or not in accordance with the state of the stage.

10. Apparatus as claimed in claim 8, wherein the computer is operative on the control means to cause a first tone to be substantially continuously transmitted throughout contact with a selected remote reader.

11. Apparatus as claimed in claim 8, wherein the computer is operative on the control means to cause selective transmission of at least two of the tones to indicate to the selected remote station the source of information that is to be interrogated.

12. Apparatus as claimed in claim 8, wherein the output means includes means for generating a further tone and for transmitting pulses of such tone to the remote reader once contact has been established.

13. Apparatus as claimed in claim 1, wherein the output means includes means for generating at least one tone within the passband of the telephone system with which the apparatus is to be used, and control means connected to the computer and the generating means and responsive to a computer instruction to cause transmission of a time division multiplex coded interrogation signal formed from the or each tone.

14. Apparatus as claimed in claim 13, wherein the generating means is arranged to generate two tones and the control means is operative to transmit a burst of one tone to indicate the digit 1 and of the ither tone to indicate the digit 0.

15. Apparatus as claimed in claim 14, wherein the control means is operative on the generating means to suspend transmission between the bursts to provide spaces therebetween.

16. Apparatus as claimed in claim 13, wherein the control means includes a register having a serial output connected to a control input of the generating means.

17. Apparatus as claimed in claim 13, wherein the computer is operative on the control means to selectively transmit either a digit 1 or a digit 0 in at least two specific time slots in the multiplex to indicate to the selected remote reader the source of information that is to be interrogated.

18. Apparatus as claimed in claim 16, including a timing circuit connected to the computer and the control means, the computer being responsive to an indication from the automatic calling means that contact has been established with a selected remote station to initiate operation of the timing circuit and the timing circuit being adapted to supply a series of clock pulses to the control means to cause transmission of the whole time division multiplex interrogation signal and to thereafter supply a single clock pulse to the input means, the input means including a register connected to receive a digital response signal and connected to receive said single clock pulse to clock in a single bit of the response signal, said timing circuit being adapted to successively repeat these two operations until each bit of the response signal has been clocked in.

19. Apparatus as claimed in claim 1, including means connected to the computer and adapted for duplex communication of the computer with a central data processor.

20. Apparatus as claimed in claim 19, wherein said communications means includes a modem for digital communication via a telephone circuit.

21. Apparatus responsive to the receipt of an interrogation signal from an interrogator connected thereto by a line to encode information for sending back to the interrogator, comprising an input register for receiving a digital interrogation signal, a gating network having inputs connected to examine at least two stages of the register and responsive to the digits of the interrogation signal in said stages to provide a signal at an output terminal if the coding of said digits is such as to indicate that a source of information available to the apparatus is to be interrogated, and encoder means connected to the output of the gating network and responsive to said signal to encode said information into a response signal for sending back to the interrogator.

22. Apparatus as claimed in claim 21, wherein said gating network has a plurality of outputs each connected to the encoder means and is operative to decode the digits of the interrogation signal in said stages and to provide a signal at one of the outputs in accordance with the coding of said digits to cause a particular one of a plurality of sources of information available to the encoder means to be interrogated, each output being associated with a respective one of the sources.

23. Apparatus as claimed in claim 21 wherein the encoder means includes a gating network and a counter operative on the gating network for controlling the encoding operation, the counter causing the gating network to send back one bit of the response signal each time the counter is incremented.

24. Apparatus as claimed in claim 23, wherein another of the stages of the input register is connected to increment the counter, whereby one bit of the response signal is sent back each successive time the digital interrogation signal is received.

25. Apparatus as claimed in claim 25, including a clock circuit arranged to supply sufficient pulses to the counter to cause transmission of the whole response signal, the input register being connected to the timing circuit and being responsive to the arrival of an interrogation signal to initiate operation of the clock circuit.

26. Apparatus as claimed in claim 1, including a timing circuit connected to the input register for supplying clock pulses thereto to clock the interrogation signal therein, and synchronising gates having inputs connected to a plurality of other stages of the register and an output connected to the timing circuit for stopping the clocking pulses once the interrogation signal has been clocked into the register.

27. Apparatus as claimed in claim 1, including a detector for converting the interrogation signal from successive bursts of tone, as received from the line, to digital form for feeding into the input register.

28. Apparatus as claimed in claim 27, including a voltage regulator connected to receive a DC voltage applied externally to the line and a power switch connected to receive the regulated output of the voltage regulator and to apply it to parts of the apparatus, the power switch having a control input connected to the detector for inhibiting operation of the power switch except when the detector indicates that an interrogation signal is being received.

29. Apparatus as claimed in claim 28, wherein the voltage regulator includes a trigger circuit connected to the power switch for inhibiting operation of the power switch when the DC voltage applied to the line drops below a predetermined value.

30. Apparatus responsive to the receipt of an interrogation signal from an interrogator connected thereto by a line to encode a response signal for sending back to the interrogator, comprising data selector gating means having an output and a plurality of inputs for connection to at least one source of digital information be be encoded, a counter having outputs connected to the data selector gating means for causing the inputs of the latter to be connected to the output of the latter in a predetermined sequence, and means responsive to the receipt of an interrogation signal to initiate operation of the counter so that a serial stream of encoded information will appear at the output of the data selector gating means.

31. Apparatus as claimed in claim 30, including gating means connected to receive the interrogation signal and responsive to a coding of such signal to gate the appropriate one of a plurality of sources of digital information to the data selector gating means.

32. Apparatus as claimed in claim 30 including multiplex control gating connected to the counter and responsive to the output of the counter to connect inputs of the data selector gating means, in turn, to a plurality of sections of a source of digital information.

33. Apparatus as claimed in claim 30, including a source of digital information comprising a plurality of ON-OFF switches.

34. Apparatus as claimed in claim 30, including a source of digital information comprising the stages of the counter.

35. Apparatus as claimed in claim 30, including identification means for providing digital information identifying the apparatus for multiplexing with the digital information from said source into the response signal.

36. Apparatus as claimed in claim 35, wherein the identifications means comprises means for patching a selected digital identification signal to an assigned plurality of the inputs of the data selector gating means.

37. Apparatus as claimed in claim 35, including multiplex control gating connected to the counter and responsive to the output of the counter to connect inputs of the data selector gating means, in turn, to a plurality of sections of a source of digital information, wherein the identification means comprises identification gating means having a plurality of inputs and means for patching a selected digital identification signal to such inputs, the multiplex control gating being connected to the identification gating means and operative to connect the digital pattern to the data selector gating means in turn with the sections of the source of digital information.

38. Apparatus as claimed in any of claims 30 to 37, including a tone generator connected to receive the output of the data selector gating means and arranged to generate a burst of a first frequency on receipt of the digit 1 and a burst of a second frequency on receipt of a digit 0.

* * * * *